United States Patent [19]

McFarland

[11] 4,164,995
[45] Aug. 21, 1979

[54] INERTIA CONTROLLED CONVEYOR CLUTCH

[76] Inventor: Douglas F. McFarland, Davis City, Iowa 50065

[21] Appl. No.: 798,371

[22] Filed: May 19, 1977

[51] Int. Cl.² ............................................. F16D 43/24
[52] U.S. Cl. .................................. 192/103 C; 56/10.3
[58] Field of Search ..................... 192/103 C; 56/10.2, 56/10.3

[56] References Cited

U.S. PATENT DOCUMENTS

| | | | |
|---|---|---|---|
| 1,925,270 | 9/1933 | Metcalf | 56/10.3 |
| 2,072,116 | 3/1937 | Lewis | 192/103 C |
| 2,092,911 | 9/1937 | Eastman | 192/103 C |
| 2,269,828 | 1/1942 | Michel et al. | 56/16 |
| 2,377,331 | 6/1945 | Dray | 56/10.3 |
| 3,404,763 | 10/1968 | Reed | 192/103 C |

*Primary Examiner*—Benjamin W. Wyche
*Attorney, Agent, or Firm*—Zarley, McKee, Thomte, Voorhees & Sease

[57] ABSTRACT

A governor for controlling the speed of a drive shaft comprising a flywheel mounted to a revolving drive shaft by a pair of diametrically opposed pins extending through the flywheel, along a diametrical line of the flywheel, and being respectively received by two oppositely disposed spiral slots along the cylindrical wall of the drive shaft. The flywheel and pins are slidably mounted to the drive shaft such that an increase or decrease in the speed of revolution of the drive shaft will cause the pins to move along the shaft in the slots and the flywheel to traverse along the axis of rotation of the drive shaft. Mechanical linkage is connected to the flywheel so that the movement of the flywheel will engage or disengage a friction clutch drive assembly operatively associated to the drive shaft, or alternatively, will control the rate of flow of fuel to an engine operatively connected to the drive shaft. In a conventional internal combustion engine, a slight change in the speed of rotation of the drive shaft causes the flywheel to travel along the shaft and, in turn, through its linkage to the carburetor, change the amount of fuel flow to the carburetor. In a farm combine, the governor is attached to the beater drive shaft and disengages the conveyor mechanism upon a decrease in the speed of rotation of the beater drive shaft.

7 Claims, 9 Drawing Figures

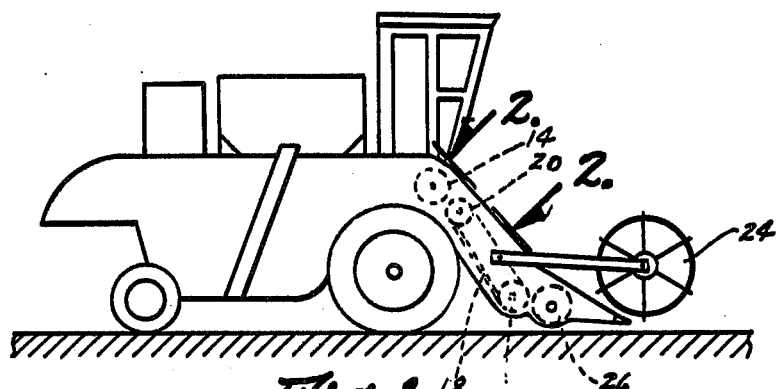
Fig. 1
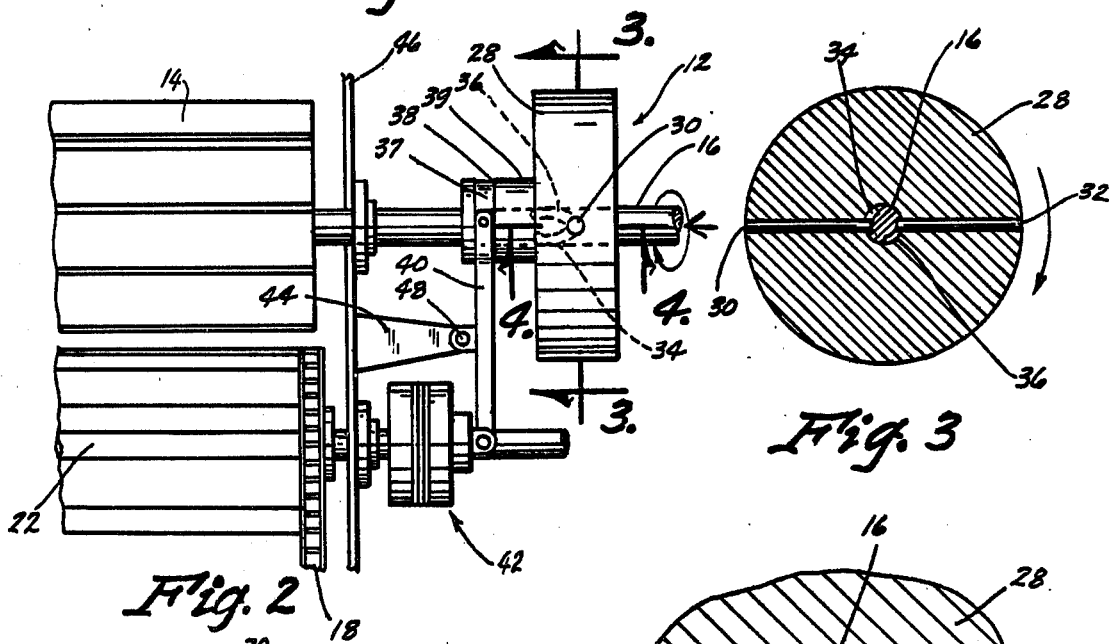
Fig. 2
Fig. 3
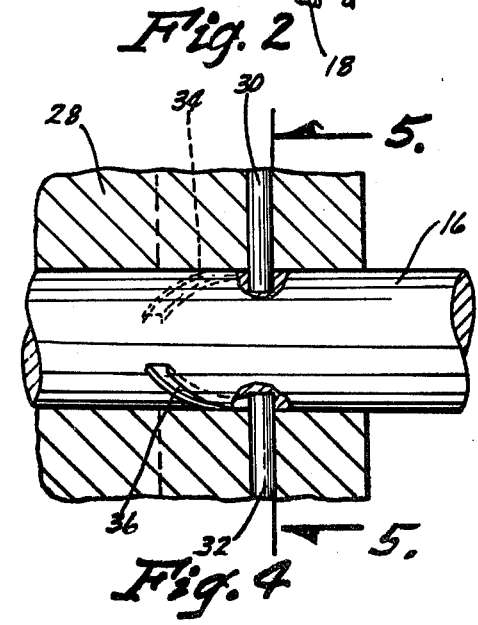
Fig. 4
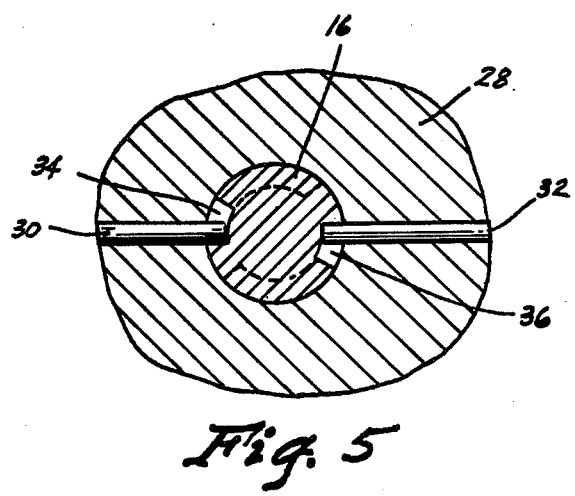
Fig. 5

INERTIA CONTROLLED CONVEYOR CLUTCH

BACKGROUND OF THE INVENTION

The invention relates to governors, and more particularly to a governor for an internal combustion engine and for the drive chain of the conveyor and beater assembly of a conventional farm combine.

Prior governors require a certain speed variation to activate them and are, therefore, not sensitive enough for certain applications.

SUMMARY OF THE INVENTION

A governor is disclosed wherein a flywheel is mounted to a revolving drive shaft by a pair of diametrically opposed pins extending through the flywheel along a diametrical line of the flywheel and being respectively received by two oppositely disposed spiral slots along the wall of the drive shaft. The flywheel and pins are slidably mounted to the drive shaft such that an increase or decrease in the speed of revolution of the shaft will cause the pins to move along the shaft in the slots and the flywheel to necessarily traverse along the axis of rotation of the drive shaft. Mechanical linkage is connected to the flywheel so that the movement of the flywheel will disengage a clutch drive assembly operatively connected to the drive shaft or the movement of the flywheel will control the rate of flow of fuel to an internal combustion engine operatively connected to the drive shaft.

It is a principal object of the invention to provide a governor that is activated by changes in the speed of rotation of a drive shaft.

A further object of the invention is to provide a governor that is sensitive to small changes in drive shaft rotation.

A still further object of the invention is to provide a governor that will control the flow of fuel to the carburetor of an internal combustion engine.

A still further object of the invention is to provide a governor that will operate cooperatively with a conventional internal combustion engine governor.

A still further object of the invention is to provide a governor that will disengage the conveyor mechanism of a farm combine when the upper beater begins to clog up or slow down.

A still further object of the invention is to provide a governor that is economical to manufacture and durable in use.

BRIEF DESCRIPTION OF THE DRAWINGS

FIG. 1 is a side view of a farm combine in combination with the invention.

FIG. 2 is an enlarged partial sectional view seen on line 2—2 of FIG. 1.

FIG. 3 is a sectional side view seen on line 3—3 of FIG. 2.

FIG. 4 is an enlarged sectional view seen on line 4—4 of FIG. 2.

FIG. 5 is a sectional view seen on line 5—5 of FIG. 4.

DESCRIPTION OF THE PREFERRED EMBODIMENT

Figure 6:
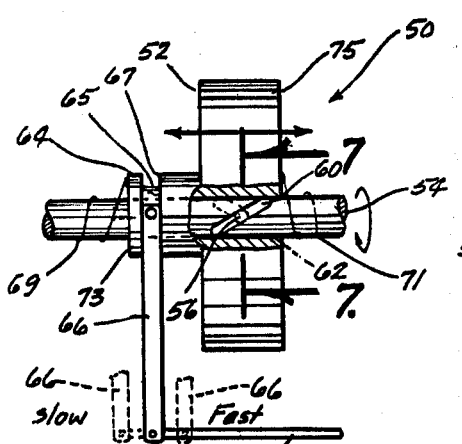
FIG. 6 is a partially broken away side view of the invention.
Figure 7:
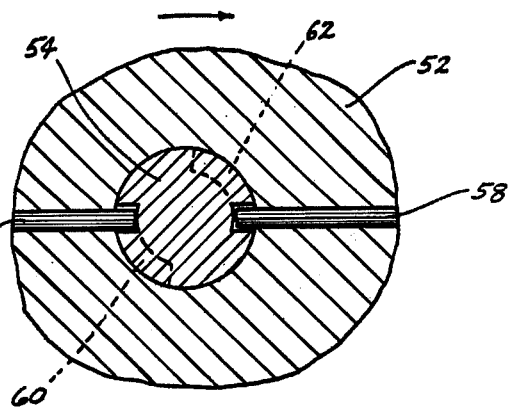
FIG. 7 is an enlarged sectional view seen on line 7—7 of FIG. 6.

The numeral 10 refers to the farm combine of FIG. 1. The numeral 12 generally refers to the governor of this invention.

As shown in FIGS. 1 and 2, the combine 10 comprises an upper beater 14, beater drive shaft 16, conveyor chain 18, conveyor drive sprockets 20, sprocket drive shaft 22, front reel 24 and header auger 26. Shafts 16 and 22 are driven through suitable connections to the combine or prime mover in conventional fashion.

Governor 12 is comprised of a flywheel 28 slidably mounted to beater drive shaft 16 by a pair of diametrically opposed pins 30 and 32. The cylindrical wall of shaft 16 contains two longitudinally aligned, oppositely disposed spiral slots 34 and 36 that receive the ends of pins 30 and 32 respectively, to operationally connect flywheel 28 to drive shaft 16.

Linkage arm 40 is pivotally connected at one end to frictional drive clutch assembly 42 and at the other end to linkage sleeve 37. Linkage sleeve 37 is rotatably mounted in the circumferential groove 38 of flywheel hub 39 so that linkage arm 40 is impervious to the rotational movement of flywheel hub 39 yet responsive to any lateral movement of flywheel 28 along shaft 16. Support post 44 extends outwardly from body portion 46 of combine 10 and is pivotally attached to linkage arm 40 such that pivotal attachment point 48 is the fulcrum point of any movement of arm 40 due to the lateral movement of flywheel 28 along shaft 16.

In operation, the front reel 24 lays the grain over so that header auger 26 can position and deliver it to conveyor chain 18 which in turn conveys the grain to upper beater 14 which thrashes the plant to dislodge the grain. Should the upper beater slow down because of clogging or overload, shaft 16 would be turning at a slower rate than flywheel 28. The rotation of flywheel 28 at a greater speed than shaft 16 causes flywheel 28 to move toward body portion 46, with pins 30 and 32 moving in slots 34 and 36, respectively. The spiral configuration of slots 34 and 36 direct the movement of the flywheel 28 toward body portion 46 by transforming the rotational speed differential between flywheel 28 and shaft 16 into a directional force component toward body portion 46. The movement of flywheel 28 toward body portion 46 causes linkage arm 40 to pivot about fulcrum point 48 and disengage friction clutch drive assembly 42. The disengaging of clutch drive assembly 42 halts conveyor chain 18 so that additional grain is not transported to the clogged or overloaded upper beater 14. Upon clearing of the upper beater 14, friction clutch drive assembly 42 is manually engaged to start conveyor chain 18 operating again.

An alternative embodiment of the governor, generally designated 50, is shown in FIG. 6. Governor 50 is comprised of flywheel 52 slidably mounted to drive shaft 54 by a pair of diametrically opposed pins 56 and 58. The cylindrical wall of shaft 54 contains two longitudinally aligned oppositely disposed spiral slots 60 and 62 that receive the ends of pins 56 and 58, respectively, to operationally connect flywheel 52 to drive shaft 54.

Figure 8:
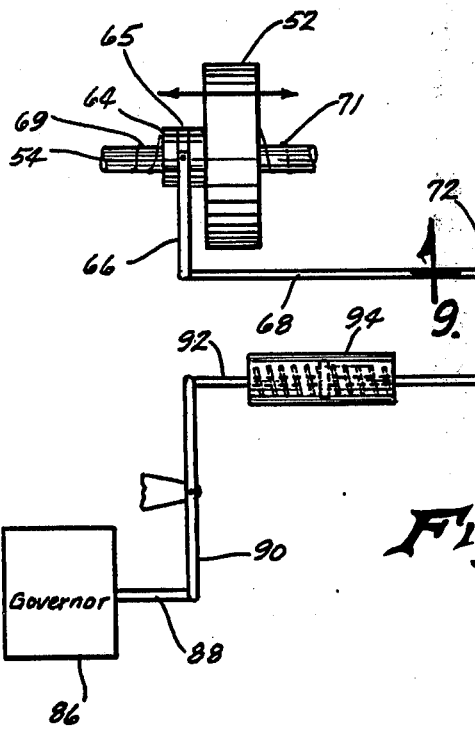
FIG. 8 is a schematic diagram of the invention and operational connection with a conventional governor and an internal combustion engine carburetor.
Figure 9:
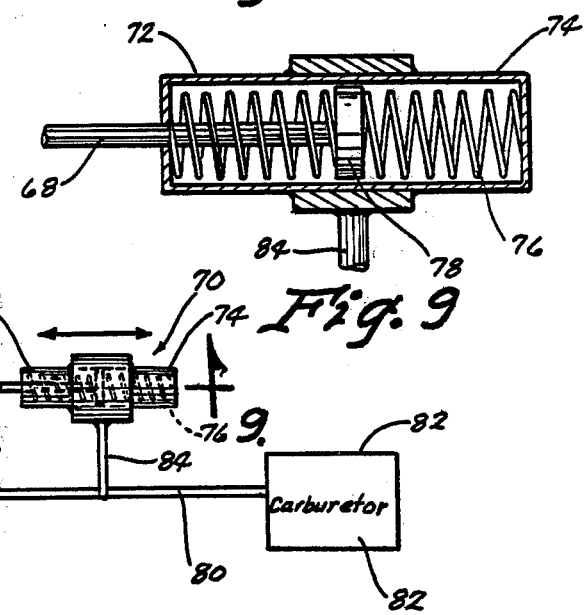
FIG. 9 is an enlarged sectional view seen on line 9—9 of FIG. 8.

Linkage arm 66 is securely attached at one end to linkage arm 68 and at the other end to linkage sleeve 65. Linkage sleeve 65 is rotatably mounted in the circumferential groove 67 of flywheel hub 64 so that linkage arm 66 is impervious to the rotational movement of flywheel hub 39 yet responsive to any lateral movement of flywheel 52 along shaft 54. As shown in FIG. 6, spring 69 is attached at one end to the flat edge 73 of flywheel hub 64 and at the other end to shaft 54. Spring 71 is attached at one end to the flat edge 75 of flywheel 52 and at the other end to shaft 54. Linkage arm 66 connects flywheel 52 and linkage arm 68 such that the lateral movement of flywheel 52 along shaft 54 correspondingly moves linkage arm 68. Linkage arm 68 is connected to shock absorbing relay 70. Shock absorbing relay 70, as shown in FIG. 9, comprises support body 72 having a cylindrical cavity 74 housing coil spring 76. Head 78 is centrally positioned in cavity 74 and interlocked between a pair of adjacent coils of spring 76 as shown in FIG. 9. Linkage arm 68 is attached to head 78 so that the movement and force of linkage arm 68 is transmitted to support body 72 through spring 76, thereby providing a dampening effect. Linkage arm 80 connects the fuel control of conventional carburetor 82 to linkage arm 84 which is securely attached to body 72. The net effect of these connections as shown in FIG. 8 is that the lateral movement of flywheel 52 along shaft 54 is transferred via the dampening effect of shock absorbing relay 70 to linkage arm 80 and thus to the fuel control (not shown) of carburetor 82. Conventional governor 86 is also connected to linkage arm 80 by linkage arms 88, 90 and 92 and shock absorbing relay 94.

In operation, when both shaft 54 and flywheel 52 are rotating at the desired, predetermined speed, pins 56 and 58 are positioned midway in slots 60 and 62, respectively, as shown in FIG. 6. This relative position is maintained as long as shaft 54 is rotating at the predetermined speed. Should the rotational speed of shaft 54 decrease, flywheel 52 will maintain the original predetermined rotational speed for a period of time due to its momentum, and will thereby be rotating about shaft 54. This relative rotational movement of flywheel 52 will exert a force on pins 56 and 58. As can best be illustrated in FIG. 6, this force will cause pins 56 and 58, and therefore flywheel 52, to move to the right along shaft 54. The movement to the right of flywheel 52 will cause arm 66 to also move to the right, thereby moving the connecting linkage to the right causing linkage arm 80 to move to the right and increasing the flow of fuel into carburetor 82 proportionately in order to increase the speed of shaft 54 to its predetermined speed. Springs 69 and 71 return flywheel 52 to its original position with pins 56 and 58 positioned midway in slots 60 and 62 when shaft 52 reaches the predetermined speed.

Should the rotational speed of shaft 54 increase, flywheel 52 will maintain the original predetermined rotational speed for a period of time due to its momentum and shaft 54 will be rotating with respect to flywheel 52. This relative rotational movement of shaft 54 with respect to flywheel 52 will exert a force on pins 56 and 58 causing pins 56 and 58 and flywheel 52 to move to the left along shaft 54. The movement to the left of flywheel 52 will cause arm 66 to also move to the left thereby moving the connecting linkage to the left, causing linkage arm 80 to move to the left and decreasing the flow of fuel into carburetor 82 proportionately in order to decrease the speed of shaft 54 to its predetermined speed. Springs 69 and 71 return flywheel 52 to its original position with pins 56 and 58 positioned midway in slots 61 and 62 when shaft 52 reaches the predetermined speed.

As shown in FIG. 8, governor 50 may be used in cooperation with a conventional governor. Thus, it can be seen that the device accomplishes at least all of its stated objectives.

What is claimed is:

1. In combination,
   a harvesting machine having a first drive shaft, a feeder conveyor chain assembly with a second drive shaft, and a friction drive clutch connected to said second drive shaft to disengage said feeder conveyor chain, and
   a governor control device comprising a flywheel having a center aperture slidably receiving said first drive shaft, means for connecting said flywheel to said first drive shaft so that the rotation of said first drive shaft rotates said flywheel and a decrease in the rotational speed of said first drive shaft relative to said flywheel causes said flywheel to move along said first driveshaft, and means for connecting said flywheel to said friction drive clutch such that the movement of said flywheel along said first drive shaft disengages said feeder conveyor chain.

2. In combination
   a harvesting machine having a drive shaft, a feeder conveyor chain, and a friction drive clutch to disengage said feeder conveyor chain, and
   a governor control device comprising a flywheel having a center aperture slidably receiving said drive shaft, means comprising diametrically opposed first and second pins extending along a dimetrical line of said flywheel and being respectively received by first and second oppositely disposed, generally longitudinally extending spiral slots in the cylindrical wall of said driveshaft for connecting said flywheel to said drive shaft so that the rotation of said drive shaft rotates said flywheel and a decrease in the rotational speed of said drive shaft relative to said flywheel causes said flywheel to move along said driveshaft, and means for connecting said flywheel to said friction drive clutch such that the movement of said flywheel along said drive shaft disengages said feeder conveyor chain.

3. The combination of claim 2 wherein said first and second pins are positioned at the ends of said first and second slots, respectively, outward from said harvesting machine, when said flywheel and said drive shaft are rotating at the same preselected rotational speed.

4. The combination of claim 2 wherein said first and second slots, each having forward and rearward ends, are oppositely disposed such that said forward end of said first slot and said rearward end of said second slot are located on one side of a plane intersecting the midpoint of the longitudinal centerlines of said slots and the axis of rotation of said shaft and said rearward end of said first slot and said forward end of said second slot are located on the other side of said plane.

5. The combination of claim 2 wherein a rotational speed differential between said flywheel and said drive shaft such that said drive shaft is rotating at a lesser rotational speed than said flywheel causes said first pin to move toward said forward end of said first slot and said second pin to move toward said forward end of said second slot thereby moving said flywheel along said drive shaft.

6. In combination,
   a harvesting machine having a drive shaft, a feeder conveyor chain assembly, and a friction drive clutch to disengage said feeder conveyor chain, and a governor control device comprising a flywheel having a center aperture slidably receiving said drive shaft, means for connecting said flywheel to said drive shaft so that the rotation of said drive shaft rotates said flywheel and a decrease in the rotational speed of said drive shaft relative to said flywheel causes said flywheel to move along said driveshaft, and means comprising a cylindrical sleeve rotatably mounted to the hub of said flywheel and a linkage arm mounted to said sleeve such that said linkage arm is impervious to the rotation of said flywheel and responsive to the movement of said flywheel along said drive shaft, for connecting said flywheel to said friction drive clutch such that the movement of said flywheel along said drive shaft disengages said feeder conveyor chain.

7. The combination of claim 6 wherein said linkage arm, having first and second ends, is pivotally connected at said first end to said cylindrical sleeve and pivotally connected at said second end to said friction drive clutch, said arm having a fulcrum point between said first and second ends, such that movement of said flywheel along said drive shaft pivots said linkage arm about said fulcrum point to disengage said friction drive clutch.

* * * * *